US012657975B2

(12) United States Patent
Thorsen et al.

(10) Patent No.: US 12,657,975 B2
(45) Date of Patent: Jun. 16, 2026

(54) MULTI-FACTOR AUTHENTICATION FOR PREMISES MONITORING SYSTEMS

(71) Applicant: The ADT Security Corporation, Boca Raton, FL (US)

(72) Inventors: Wayne Thorsen, Boca Raton, FL (US); Mark Reimer, Denver, CO (US); Shy Ward, Flower Mound, TX (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 18/736,822

(22) Filed: Jun. 7, 2024

(65) Prior Publication Data

US 2025/0037523 A1 Jan. 30, 2025

Related U.S. Application Data

(60) Provisional application No. 63/616,163, filed on Dec. 29, 2023, provisional application No. 63/516,367, filed on Jul. 28, 2023.

(51) Int. Cl.
*G07C 9/00* (2020.01)
*G07C 9/23* (2020.01)
*G07C 9/27* (2020.01)

(52) U.S. Cl.
CPC ..... *G07C 9/00563* (2013.01); *G07C 9/00571* (2013.01); *G07C 9/23* (2020.01); *G07C 9/27* (2020.01)

(58) Field of Classification Search
CPC ........................ G07C 9/00563; G07C 9/00571
See application file for complete search history.

(56) References Cited

U.S. PATENT DOCUMENTS

| | | | |
|---|---|---|---|
| 9,100,453 | B2 | 8/2015 | Chen et al. |
| 9,626,841 | B2 | 4/2017 | Fadell et al. |
| 10,490,003 | B2 | 11/2019 | Eyring et al. |
| 10,565,856 | B2 | 2/2020 | Sol |
| 10,567,312 | B2 | 2/2020 | Goldberg et al. |
| 10,586,114 | B2 | 3/2020 | Potter et al. |
| 10,629,015 | B1 | 4/2020 | Burge et al. |
| 10,635,907 | B2 | 4/2020 | Child et al. |

(Continued)

OTHER PUBLICATIONS

International Search Report and Written Opinion dated Apr. 11, 2025 for International Application No. PCT/US2024061443 filed Dec. 20, 2024, consisting of 15 pages.

(Continued)

*Primary Examiner* — Nabil H Syed
(74) *Attorney, Agent, or Firm* — Weisberg I.P. Law, P.A.

(57) ABSTRACT

A system is provided. The system includes at least one computing device configured to receive first authentication data based on video of a person captured by a premises device located at a premises, receive second authentication data based on audio of the person speaking a verbal passcode captured by the premises device, and authenticate the person based on the first authentication data and the second authentication data. The at least one computing device is configured to determine that the person is permitted access to the premises according to an access policy, and in response to authenticating the person and determining that the person is permitted access to the premises, cause a lock securing an access point of the premises to unlock.

17 Claims, 6 Drawing Sheets

(56) References Cited

U.S. PATENT DOCUMENTS

| | | | | |
|---|---|---|---|---|
| 10,750,128 | B2 | 8/2020 | Fu et al. | |
| 10,832,509 | B1 | 11/2020 | Read et al. | |
| 10,861,265 | B1 | 12/2020 | Merkley et al. | |
| 10,999,561 | B2 | 5/2021 | Child et al. | |
| 11,361,060 | B1 | 6/2022 | Lyman et al. | |
| 11,455,854 | B2 | 9/2022 | Hager et al. | |
| 11,477,139 | B2 | 10/2022 | Rosenberg et al. | |
| 11,735,018 | B2 | 8/2023 | Khadloya et al. | |
| 2015/0109112 | A1* | 4/2015 | Fadell | G08B 19/005 340/328 |
| 2015/0248798 | A1 | 9/2015 | Howe et al. | |
| 2015/0332273 | A1 | 11/2015 | Bruno | |
| 2016/0014103 | A1 | 1/2016 | Masters et al. | |
| 2016/0055698 | A1* | 2/2016 | Gudmundsson | G07C 9/32 340/5.52 |
| 2016/0078699 | A1 | 3/2016 | Kalb et al. | |
| 2017/0064261 | A1 | 3/2017 | Peng et al. | |
| 2017/0373876 | A1 | 12/2017 | Scalisi | |
| 2018/0005143 | A1 | 1/2018 | Camargo et al. | |
| 2018/0025726 | A1 | 1/2018 | Gatti de Bayser et al. | |
| 2018/0350170 | A1 | 12/2018 | Wang et al. | |
| 2019/0327448 | A1* | 10/2019 | Fu | G08B 3/10 |
| 2020/0089850 | A1 | 3/2020 | Wan | |
| 2020/0267354 | A1 | 8/2020 | Siminoff | |
| 2020/0349786 | A1* | 11/2020 | Ho | G06V 40/172 |
| 2021/0134100 | A1 | 5/2021 | LaRovere et al. | |
| 2021/0232983 | A1 | 7/2021 | Camargo et al. | |
| 2021/0398368 | A1* | 12/2021 | Edwards | G07C 9/00309 |
| 2022/0237972 | A1 | 7/2022 | Read et al. | |
| 2022/0247738 | A1* | 8/2022 | Gahir | G06F 21/34 |
| 2022/0397686 | A1 | 12/2022 | Scacchi et al. | |
| 2023/0083819 | A1 | 3/2023 | Hager et al. | |

OTHER PUBLICATIONS

International Search Report and Written Opinion dated Oct. 17, 2024 for International Application No. PCT/US2024/038521 filed on Jul. 18, 2024, consisting of 17 pages.

International Search Report and Written Opinion dated Oct. 14, 2024 for International Application No. PCT/US2024/038353 filed on Jul. 17, 2024, consisting of 12 pages.

U.S. Office Action dated Aug. 12, 2025 for U.S. Appl. No. 18/736,812, consisting of 12 pages.

* cited by examiner

MULTI-FACTOR AUTHENTICATION FOR PREMISES MONITORING SYSTEMS

CROSS-REFERENCE TO RELATED PATENT APPLICATION

This application is related to and claims priority to U.S. Provisional Patent Application Ser. No. 63/516,367, filed on Jul. 28, 2023, entitled METHODS AND SYSTEMS FOR CONTEXT BASED PREMISES ACCESS, and to U.S. Provisional Application Ser. No. 63/616,163, filed on Dec. 29, 2023, entitled MULTI-FACTOR AUTHENTICATION FOR PREMISES MONITORING SYSTEMS, the entireties of which are incorporated herein by reference.

TECHNICAL FIELD

The present technology is generally related to multifactor authentication for controlling access to a premises monitored by a premises monitoring system.

BACKGROUND

There may be various reasons why people give access to their homes to neighbors, friends, family, delivery workers, service workers, etc. For example, a person may be out of town and need someone to look after the home and/or pets at the home. In another example, the person may be out of town but may have a company that provides recurring maintenance or service to the home or may expect an important delivery that would be safer if stored inside the home rather than remaining in front of the door or on the front porch.

The person may be left with limited options for providing access to the home while away. For example, the person may provide a neighbor with the physical home key and/or share a personal identification number (PIN) to a smart door lock or keep a backdoor unlocked on a particular date and time. However, the person who is away from the home is left with limited options for verifying who accessed the home, when the home was accessed, and why the home was accessed.

Further, companies that provide in-home grocery delivery may have issues with a home's security system as the homeowner or person who is away from the home may forget to disarm the security system on the grocery delivery day. That is, even though the delivery person may have a physical home key and/or a PIN to a smart door lock, the armed security system will still trigger, which results in a false alarm and possibly monetary fines in certain jurisdictions. Even if the homeowner or person who is away from the home remembers to disarm the security system to mitigate the problem of false alarms, disarming the security system while the person is away from the home may negate the value of having a security system, since the home may be left unprotected by the security system for the entire day due to the 15-minute delivery.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

Figure 1:
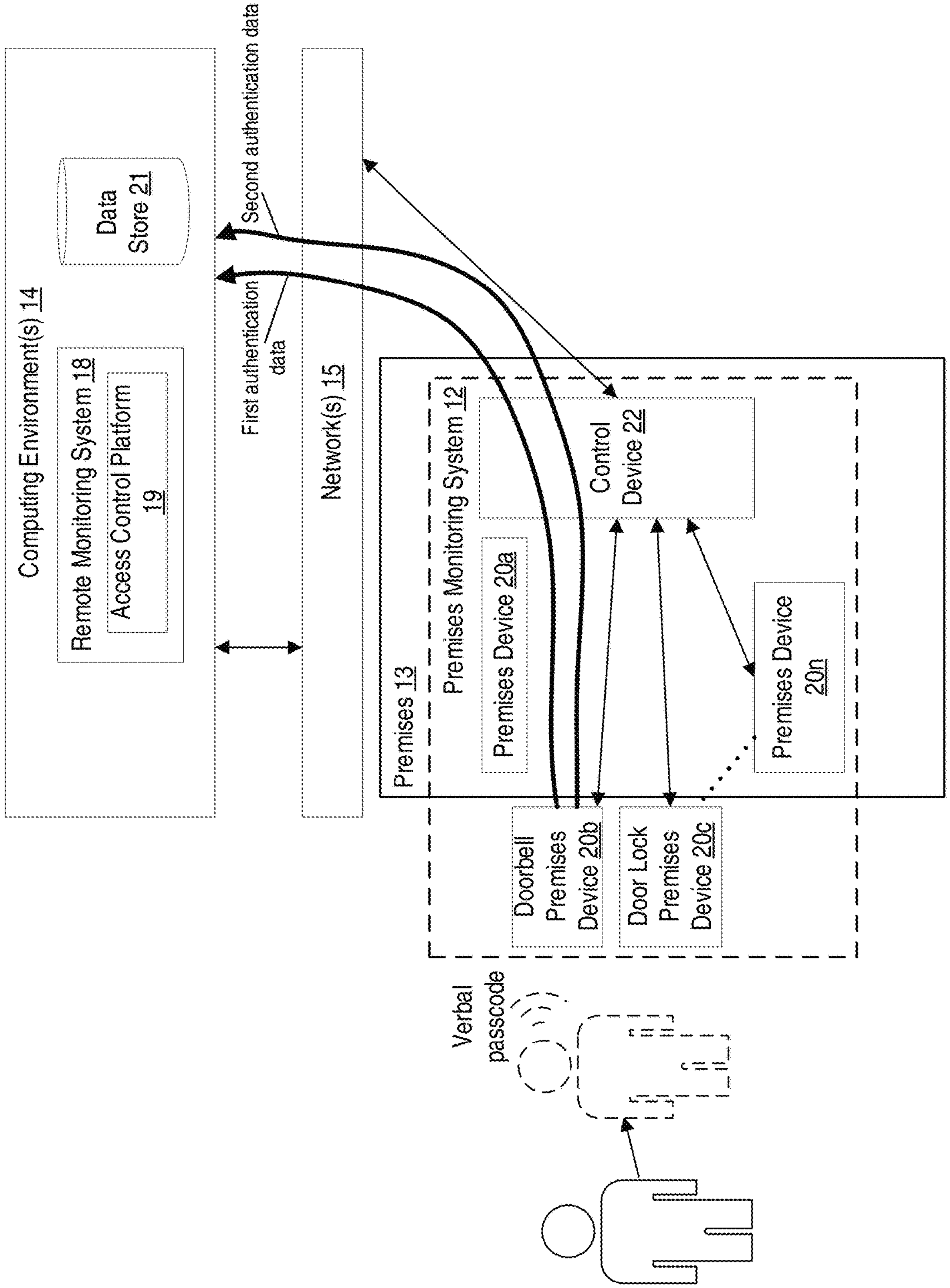
FIG. 1 is a block diagram of an example system according to some embodiments of the present disclosure.

With reference to FIG. 1, shown is a block diagram of an example system 10 according to some embodiments of the present disclosure. System 10 may include premises monitoring system 12 and one or more computing environments 14 that may be in communication with each other via one or more networks 15 (collectively referred to as network 15). Premises monitoring system 12 may be configured to provide functionality relating to premises monitoring. For example, premises monitoring system 12 may be used to detect burglaries, smoke, fires, carbon monoxide leaks, water leaks, etc., and report detected events to remote monitoring system 18 of computing environment 14. Additionally, the premises monitoring functionality performed by premises monitoring system 12 may include home automation functionality. Examples of home automation functionality include thermostat control, door lock control, lighting control, appliance control, entertainment system control, etc.

Premises monitoring system 12 may include one or more premises devices 20*a*-20*n* (collectively referred to as "premises devices 20") for providing one or more of monitoring functionality, home automation functionality, etc. Premises device 20 may be in communication with control device 22 via one or more networks such as, for example, a local area network at premises 13 and/or short-range wireless protocol network (e.g., BLUETOOTH, BLUETOOTH LOW ENERGY (BLE), ultra-wideband (UWB), ZIGBEE, Z-WAVE, among other Institute of Electrical and Electronics Engineers (IEEE) based wireless protocols, etc.). Premise devices 20 may include one or more sensors, devices configured to capture audio, images, and/or video, and/or other devices. For example, premises devices 20 may include motion sensors, fire sensors, smoke sensors, heat sensors, carbon monoxide sensors, flood sensors, flow sensors, level sensors, temperature sensors, humidity sensors, proximity sensors, contact sensors, glass break sensors, water consumption sensors, water pressure sensors, etc. Devices configured to capture audio, images, and/or video may include still image cameras, video cameras, microphones, etc. Additional examples of premises devices 20 include sirens, garage door controllers, doorbells (e.g., configured to capture audio, images and/or video), temperature sensors, humidity sensors, lighting devices, switches, electrical outlets, door locks, premises locks, and electrical plugs.

Premises monitoring system 12 further comprises control device 22 that may be configured to control various aspects of premises monitoring system 12. For example, control device 22 may be configured to control premises devices 20, such as locks, doors, windows, actuators, valves, motors, and any other controllable devices associated with premises monitoring system 12. A control device 22 in various embodiments may include a user interface, such as one or more buttons, a touch screen, a display, a microphone, a speaker, and/or other types of user interface components, to facilitate a user interacting with and controlling the premises monitoring system 12. The control device 22 may also be configured to communicate with one or more components of computing environment 14. Furthermore, the control device 22 may be configured to transmit data received from one or more premises devices 20 to components of computing environment 14. According to various embodiments, control device 22 may be a gateway device, a hub, an alarm system panel, and/or another type of device configured to control aspects of premises monitoring system 12.

Further, computing environment 14 may include remote monitoring system 18, access control platform 19 and data store 21. In one or more embodiments, access control platform 19 is part of and/or a sub-component of remote monitoring system 18. Remote monitoring system 18 may be configured to provide remote monitoring services for multiple premises monitoring systems 12. For example, in the event that an open door, open window, glass break, etc. is detected by a premises device 20 when premises monitoring system 12 is in an armed state, premises monitoring system 12 may transmit an alarm signal to remote monitoring system 18. In response, the remote monitoring system 18 and/or a human agent associated with remote monitoring system 18 may notify a public safety answering point (PSAP) for first responders, such as police, fire, emergency medical responders, etc., and/or one or more designated users associated with the premise monitoring system 12 via electronic messages and/or telephone calls.

Access control platform 19 of remote monitoring system 18 may be configured to allow temporary access (e.g., time-based access, alarm-based access, event-based access, guest access, etc.) to premises 13 to one or more people based on whether various authentication data meets at least one authentication criterion that may be stored in data store 21. In particular, access control platform 19 may be configured to provide one or more types of access to premises 13 via premises monitoring system 12. For example, certain types of users may be provided access to premises 13 for different types of access control. Different types of people may include the family of at least one person associated with premises 13 and neighbors with respect to premises 13 that are configured for access to premises 13 according to one or more access control levels. Further, another type of user may comprise one or more of guests, vendors, and/or service providers that may be associated with different types of access control for being granted access to premises 13.

Further, the different types of access control may comprise one or more of time-based access, alarm-based access, event-based access or guest-based access. Time-based access may provide a person with limited time to access one or more portions of premises 13, such as when a homeowner, resident, or other person associated with premises 13 is temporarily away from premises 13 and may want someone to enter premises 13 for a limited amount of time. Alarm-based access may correspond to access that is triggered by an alarm event, such as an alarm event detected by a premises monitoring system 12, which may include, for example, leak detection alarms, smoke alarms, etc. and/or other event that may indicate a danger to life or property. Hence, controlled access to the premises may be provided in response to one or more alarms, such as to allow other users and/or first responders access to the premises 13.

Event-based access may correspond to providing access to premises 13 based on an event detected by premises monitoring system 12. For example, a fall may be detected by computing environment 14 and/or components of premises monitoring system 12 based on analytics performed on video recorded by a premises device 20 such that a person may be granted access to premises 13, after authentication described herein, to help the individual who fell. Guest-based access may comprise providing a guest (or helper, service person, etc.) access to premises 13 for a specific purpose. For example, the guest may be a dog walker who requires temporary access to premises 13 to get and walk the dog.

Further, access control platform 19 may be configured to perform functionality related to granting access, if any, to an authenticated person. For example, access control platform 19 may be configured to authenticate a person, and in response, retrieve access data, such as an access profile, for the authenticated person. The access data may be stored in data store 21 and may indicate the one or more types of access control that are applicable to the user and one or more rules (e.g., criterion, criteria, access policies) that specify when to grant access. That is, one or more pre-configured rules may be stored in data store 21 and specify the type(s) of authentication acceptable for a particular user and how many authentication factors are required for the access control platform 19 to grant the person access to premises 13. The one or more rules may be based on one or more of: day(s) of the week, time(s) of day, type of triggered alarm, type of detected event, type of vendor, the purpose of the person accessing the premises 13, etc. Access control platform 19 may function as a rules engine and may ensure premises monitoring system 12 is disarmed prior to unlocking a door to prevent false alarms.

In one or more embodiments, one or more types of access can be combined with additional rules or conditions, such as rules or conditions based on one or more of time of day, day of the month, premises monitoring system 12 modes (e.g., armed away, vacation mode, etc.) or a number of occurrences. The number of occurrences may correspond to a number of times a person is allowed entry to premises 13 within a predefined time window, such as one access attempt on Tuesday where subsequent access attempts on Tuesday will fail.

Data store 21 may be configured to store various information and/or data associated with authenticating a person as described herein. For example, data store 21 may store at least one authentication criterion (e.g., a rule) that specifies one or more conditions required for a person to be deemed authenticated for the purpose of granting the person access to premises 13. In some embodiments, the authentication criteria define one or more rules that must be satisfied for a person to be deemed authenticated for the purpose of granting access to premises 13. One example of a rule requires authentication to occur, within a time window, based on two or more forms of authentication data (e.g., multi-factor authentication). The time window may be initiated, for example, upon the access control platform 19 receiving the first authentication data. For example, in response to receiving first authentication data (e.g., an indication of a recognized person), remote monitoring system 18 or access control platform 19 may trigger a countdown timer, and the second authentication data (e.g., an audible passcode) may be required to be received before expiration of the timer in order to meet a rule.

The use of various forms of authentication data (e.g., various authentication factors) provides an extra layer of security beyond accessing premises 13 using a physical key or a door lock PIN. Further, the homeowner (e.g., authorized user) may determine how many authentication factors are required to allow access to premises 13. Various examples of authentication factors that may be used in accordance with the teachings described herein include one or more of the following: facial recognition, verbal passcode, voice biometric, keypad PIN, fingerprint (collected by, for example, door lock premises device 20*c*), authenticator software application operating on a user's wireless device, short message service (SMS) code sent to the user's wireless device, or the presence of a registered device via global positioning system (GPS), near field communication (NFC), BLE, UWB, WIFI, etc. In addition, multiple location presence methods could be used together for additional security. For example, GPS and BLE may be used for location premises detection and/or determination by premises monitoring system 12 and/or access control platform 19. A registered device may correspond to a device that has been registered with the premises monitoring system 12 and/or access control platform 19 such that, for example, access control platform 19 can associate the presence of the registered device at premises 13 with a presence of the person at premises 13.

Additionally, premises monitoring system 12 and/or access control platform 19 could allow for a wireless device of a person to become a "trusted" device after completing multiple authentication steps so that, on subsequent access occasions, the user only needs to be authenticated using a single authentication factor, as long as the other authentication factor required for the user remain unchanged. For example, following successful authentication that verifies the identity of a person, using a biometric authentication or other authentication mechanisms, access control platform 19 will correlate the trusted device with the identity of the person so that the trusted device, having the security provider's mobile application running on it, can be trusted. This approach may require the user to authenticate with the mobile application. If, at a later point in time, the homeowner changes the required authentication factors to authenticate the person, the trusted device loses its "trusted" status and requires the user to re-perform the multiple authentication steps.

In one or more embodiments, access control platform 19 may order multi-factor authentication methods to prioritize security and reduce latency associated with access control. For example, some multi-factor authentication methods can be verified while the person is: 100-150 meters away from premises 13 using, for example, a geo-fence, 10-30 meters away from premises 13 using, for example, BLE, or 1-5 meters away from premises 13 using facial recognition. Performing authentication while the person is approaching or proximate to the premises 13 enables, for example, activating the next authentication method only after the previous method has been successfully verified, thereby helping reduce battery consumption by battery-powered premises devices 20, and/or helping reduce the wireless communication noise.

Figure 2:
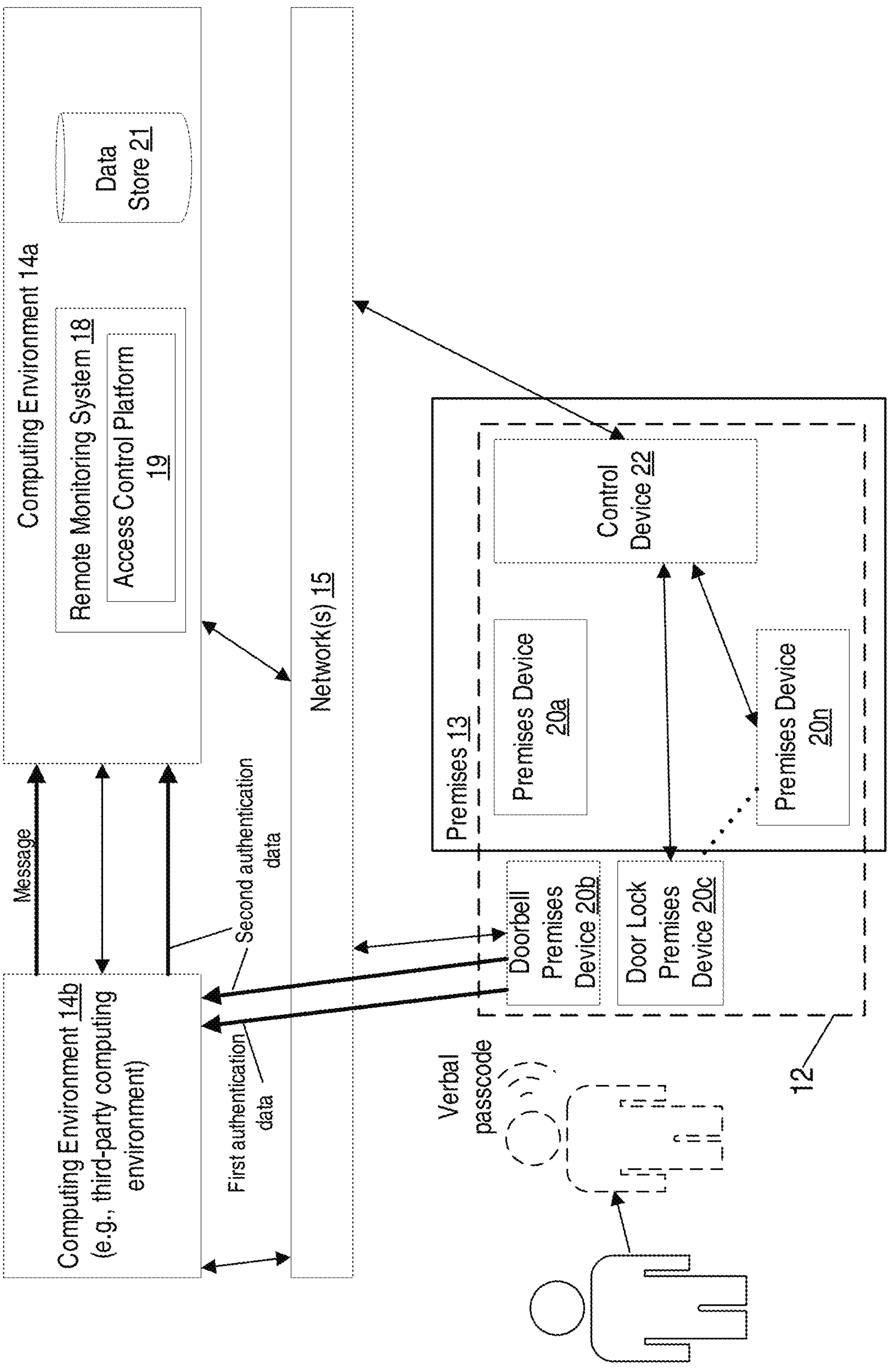
FIG. 2 is a block diagram of another example system according to some embodiments of the present disclosure.

FIG. 2 is a diagram of another example embodiment of a system 10. In the example depicted in FIG. 2, system 10 includes computing environment 14 (now referred to as computing environment 14*a*) as described with respect to FIG. 1. As shown in FIG. 2, the system 10 further includes computing environment 14*b*. In various embodiments, the computing environment 14*b* may be a computing system operated by a third party relative to the operator of the remote monitoring system 18 and/or access control platform 19. The computing environment 14*b* may be, for example, a cloud computing platform that provides cloud computing resources for multiple end-users. The cloud computing resources provided by the computing environment 14*b* may include, for example, cloud data storage and/or other resources.

In the example system 10 of FIG. 2, the doorbell premises device 20*b* is configured to communicate with computing environment 14*b*. Computing environment 14*b* may be configured to store data received from doorbell premises device 20*b* and perform one or more functions on the data it receives and/or stores.

According to some embodiments, a doorbell premises device 20*b* may be a device configured to capture media such as one or more of audio, images, or video. To this end, doorbell premises device 20*b* may include one or more still image cameras, video cameras, microphones, etc. As an example, the doorbell premises device 20*b* may be a network-connected doorbell (e.g., a "smart" doorbell) that has one or more cameras, microphones, network interfaces, and/or other electronic components. According to some embodiments, doorbell premises device 20*b* may be configured to transmit authentication data to computing environment 14*b* via network 15, where the authentication data may comprise image data, video data and/or an indication of a result of facial recognition performed on the image data and/or the video data. For example, in some embodiments, doorbell premises device 20*b* is configured to perform facial recognition on captured media (e.g., one or more of audio, image(s) or video), detect a recognized face of a person in video generated by doorbell premises device 20*b* and send an indication of a recognized person being detected to computing environment 14*b*. Therefore, in some embodiments, doorbell premises device 20*b* is configured to transmit first authentication data to the computing environment 14*b* where the first authentication data includes one or more of an indication of a recognized person being detected or the captured media.

In some embodiments, in response to the computing environment 14*b* receiving the indication of the recognized person being detected, the computing environment 14*b* is configured to transmit, to computing environment 14*a*, a message indicating that a recognized person has been detected at the premises 13.

In some embodiments, computing environment 14*b* may be configured to apply analytics to at least a portion of the media received from doorbell premises device 20*b*. For example, computing environment 14*b* may be configured to perform facial recognition on media received from doorbell premises device 20*b* to determine whether the analyzed media matches a known profile, i.e., a recognized person is detected in the media. The known profile may correspond to a profile of a family member, vendor, guest, helper, or other person that has been registered in a library of individuals known to one or more authorized users of the premises monitoring system 12. In some embodiments, if the analyzed data matches a known user profile, computing environment 14*b* transmits a message to computing environment 14*a* indicating that a recognized person has been detected at the premises.

Further, while the example of FIG. 2 was described using doorbell premises device 20*b*, one or more functions of doorbell premises device 20*b* described herein may be performed by another premises device 20 and/or another device that is associated with premises monitoring system 12. For example, the verbal passcode may be captured by a standalone device that is configured to communicate with control device 22 and/or computing environment(s) 14, where the standalone device comprises a microphone or video camera. In another example, the premises device 20 that captures the authentication data may be a video camera proximate to the access location, a smart display with a video camera and a microphone, or another device that is configured to capture one or more of an image, video, or audio.

Figure 3:
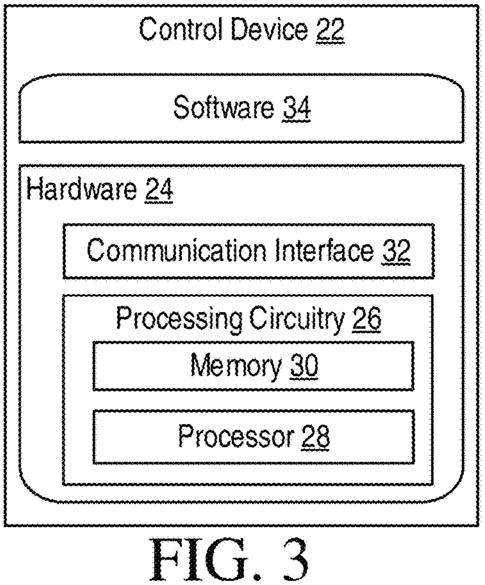
FIG. 3 is a block diagram of an example control device of FIG. 1 and/or FIG. 2 according to some embodiments of the present disclosure.

Referring now to FIG. 3, FIG. 3 shows a block diagram illustrating an example control device 22 of premises monitoring system 12. As shown, control device 22 comprises hardware 24. The hardware 24 may include processing circuitry 26. The processing circuitry 26 may include one or more processors 28 and one or more memories 30. Each processor 28 may include and/or be associated with one or more central processing units, data buses, buffers, and interfaces to facilitate operation. In addition to or instead of a processor 28 and memory 30, the processing circuitry 26 may comprise other types of integrated circuitry that perform various functionality. Integrated circuitry may include one or more processors 28, processor cores, field programmable gate arrays (FPGAs), application specific integrated circuits (ASICs), graphics processing units (GPUs), Systems on Chips (SoCs), or other components configured to execute instructions. The processor 28 may be configured to access (e.g., write to and/or read from) the memory 30, which may comprise any kind of volatile and/or nonvolatile memory, e.g., cache, buffer memory, random access memory (RAM), read-only memory (ROM), optical memory, and/or erasable programmable read-only memory (EPROM). Further, memory 30 may be embodied in the form of one or more storage devices. The processing circuitry 26 may be configured to perform various functionality described herein. For example, computer instructions may be stored in memory 30 and/or another computer-readable medium that, when executed by processor 28, causes the processor 28 to perform various functionality described herein.

Hardware 24 may include communication interface 32 facilitating communication between control device 22 and one or more elements in system 10. For example, communication interface 32 may be configured for establishing and maintaining at least a wireless or wired connection with one or more elements of system 10 such as premises devices 20 and/or computing environment 14.

Control device 22 further has software 34 (which may include one or more software applications) stored internally in, for example, memory 30, or stored in external memory (e.g., database, storage array, network storage devices, etc.) accessible by the control device 22 via an external connection. Software 34 may include any software or program that configures processing circuitry 26 to perform the steps or processes of the present disclosure.

The processing circuitry 26 may be configured to control any of the methods and/or processes described herein and/or to cause such methods, and/or processes to be performed, e.g., by control device 22. Processor 28 corresponds to one or more processors 28 for performing control device 22 functions described herein. The memory 30 is configured to store data and/or files and/or other information/data. In some embodiments, the software 34 may include instructions that, when executed by the processor 28 and/or processing circuitry 26, causes the processor 28 and/or processing circuitry 26 to perform the processes described herein with respect to control device 22. Accordingly, by having computer instructions stored in memory 30 accessible to the processor 28, the processor 28 may be configured to perform the actions described herein.

Figure 4:
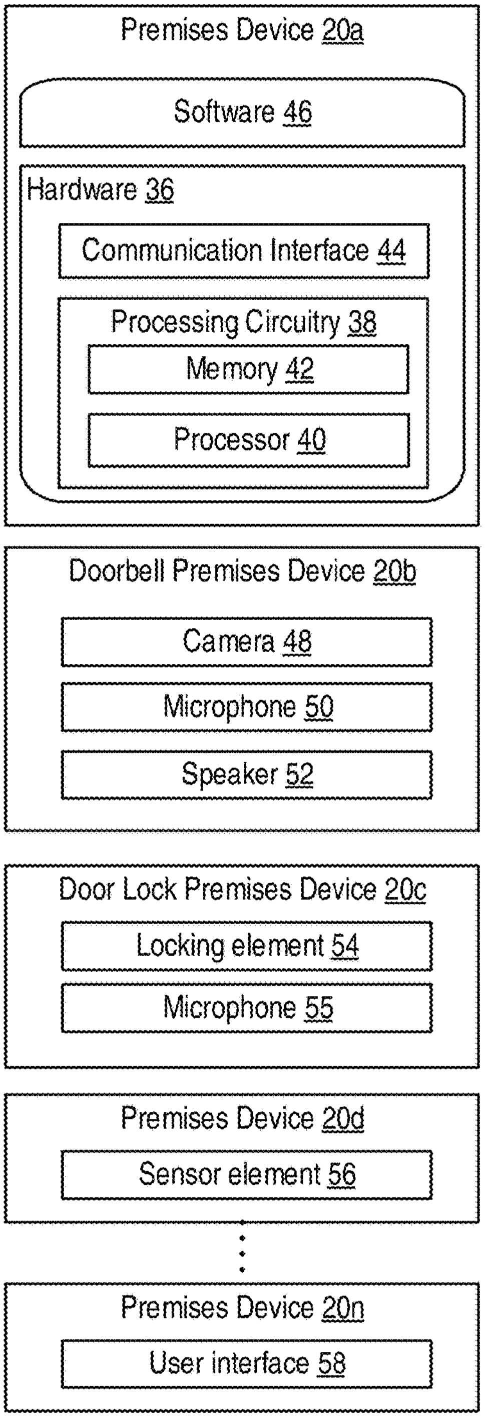
FIG. 4 is a block diagram of example premises devices of FIG. 1 and/or FIG. 2 according to some embodiments of the present disclosure.

FIG. 4 is a block diagram illustrating several example premises devices 20*a-n* (referred to collectively herein as premises devices 20) according to some embodiments of the present disclosure. As shown, premises device 20*a* comprises hardware 36. The hardware 36 may include processing circuitry 38. The processing circuitry 38 may include one or more processors 40 (i.e., one or more premises device processors) and one or more memories 42. Each processor 40 may include and/or be associated with one or more central processing units, data buses, buffers, and interfaces to facilitate operation. In addition to or instead of a processor 40 and memory 42, the processing circuitry 38 may comprise other types of integrated circuitry that performs various functionality. Integrated circuitry may include one or more processors 40, processor cores, FPGAs, ASICs, GPUs, SoCs, or other components configured to execute instructions. The processor 40 may be configured to access (e.g., write to and/or read from) the memory 42, which may comprise any kind of volatile and/or nonvolatile memory, e.g., cache, buffer memory, RAM, ROM, optical memory, and/or EPROM. Further, memory 42 may be embodied in the form of one or more storage devices. The processing circuitry 38 may be configured to perform various functionality described herein. For example, computer instructions may be stored in memory 42 and/or another computer-readable medium that, when executed by processor 40, causes the processor 40 to perform various functionality associated premises device 20*a*.

Hardware 36 may include communication interface 44 facilitating communication between premises device 20*a* and one or more elements in system 10. For example, communication interface 44 may be configured for establishing and maintaining at least a wireless or wired connection with one or more elements of system 10 such as control device 22 and/or computing environment 14.

Premises device 20*a* further has software 46 (which may include one or more software applications) stored internally in, for example, memory 42, or stored in external memory (e.g., database, storage array, network storage devices, etc.) accessible by the premises device 20*a* via an external connection. Software 46 may include any software or program that configures processing circuitry 38 to perform the steps or processes of the present disclosure.

The processing circuitry 38 may be configured to control any of the methods and/or processes described herein and/or to cause such methods, and/or processes to be performed, e.g., by premises device 20*a*. Processor 40 corresponds to one or more processors 40 for performing premises device 20*a* functions described herein. The memory 42 is configured to store data and/or files and/or other information/data. In some embodiments, the software 46 may include instructions that, when executed by the processor 40 and/or processing circuitry 38, causes the processor 40 and/or processing circuitry 38 to perform the processes described herein with respect to premises device 20*a*. Accordingly, by having computer instructions stored in memory 42 accessible to the processor 40, the processor 40 may be configured to perform the actions described herein.

With reference to the doorbell premises device 20*b* in FIG. 4, in one or more embodiments, doorbell premises device 20*b* includes the same or similar hardware as premises device 20*a* described above, except that doorbell premises device 20*b* further includes one or more of camera 48, microphone 50 or speaker 52. Camera 48 is configured to capture media such as, for example, at least one of video or still images. Microphone 50 is configured to capture media such as, for example, audio proximate microphone 50. In one example, microphone 50 may capture an audible password spoken by a person proximate to microphone 50. Speaker 52 may be configured to emit one or more audible sounds.

In one or more embodiments, doorbell premises device 20*b* may be a networked doorbell having a camera 48 and a microphone 50.

With reference to the door lock premises device 20*c* in FIG. 4, in one or more embodiments, door lock premises device 20*c* includes the same or similar hardware as premises device 20*a* described above, except that door lock premises device 20*c* further includes locking element 54 and microphone 55. For example, locking element 54 may comprise an electrically actuatable door locking mechanism where door lock premises device 20*c* may receive a command to lock or unlock the door locking mechanism and actuate the door locking mechanism according to the command. In one or more embodiments, door lock premises device 20*c* is positioned at and/or proximate an access point or location of premises 13.

Further, microphone 55 of door lock premises device 20*c* is configured to capture media such as, for example, audio proximate microphone 55. Door lock premises device 20*c* may perform speaker recognition or voice biometrics using the captured media. Speaker recognition or voice biometrics may correspond to a process for identifying a person who was speaking in captured audio. In one example, door lock premises device 20*c* is configured to, via processing circuitry 38, identify a person who spoke the captured audio by performing speaker recognition or voice biometrics on the captured audio. In this example, it may be assumed that the identified person had been previously registered with premises monitoring system 12. The identification of the person through speaker recognition or voice biometrics may be one factor of authentication in the multi-factor authentication process described herein.

In one or more embodiments, premises device 20*d* includes the same or similar hardware as premises devices 20*a* and/or 20*b* described above, except that door lock premises device 20*c* further includes one or more sensor elements 56 configured to perform sensing as described herein. In one or more embodiments, premises device 20*n* is a monitoring interface device that includes the same or similar hardware as premises device 20*a* described above, except that premises device 20*n* further includes user interface 58, such as a control panel touchscreen or buttons to allow a user to interface with premises device 20*n*. In other words, each premises device 20 may comprise hardware and software that is similar to the hardware and software described with respect to premises devices 20*a* and/or 20*b*, but with other elements to provide desired functionality, e.g., sensing, locking, user interface, etc. Further, any one of premises devices 20*d*-20*n* may be configured to perform the capturing of authentication data that is described herein with respect to doorbell premises device 20*b*.

Figure 5:
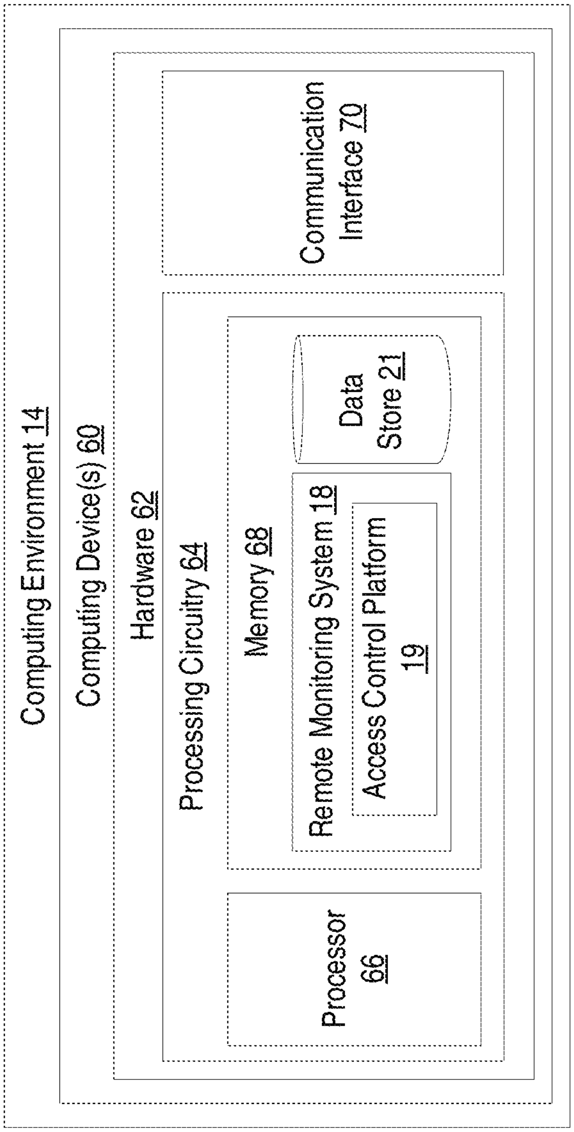
FIG. 5 is a block diagram of an example computing environment of FIG. 1 and/or FIG. 2 according to some embodiments of the present disclosure.

FIG. 5 is a block diagram illustrating the example computing environment 14 according to various embodiments. As shown, the computing environment 14 may include one or more computing devices 60. In embodiments using multiple computing devices 60, the computing devices 60 may be located in a single installation or may be distributed among many different geographic locations. As shown, each computing device 60 comprises hardware 62. The hardware 62 may include processing circuitry 64. The processing circuitry 64 may include one or more processors 66 and one or more memories 68. Each processor 66 may include and/or be associated with one or more central processing units, data buses, buffers, and interfaces to facilitate operation. In addition to or instead of a processor 66 and memory 68, the processing circuitry 64 may comprise other types of integrated circuitry that perform various functionality. Integrated circuitry may include one or more processors 66, processor cores, FPGAs, ASICS, GPUs, SoCs, or other components configured to execute instructions. The processor 66 may be configured to access (e.g., write to and/or read from) the memory 68, which may comprise any kind of volatile and/or nonvolatile memory, e.g., cache, buffer memory, RAM, ROM, optical memory, and/or EPROM. Further, memory 68 may be embodied in the form of one or more storage devices. The processing circuitry 64 may be configured to perform various functionality described herein. For example, computer instructions may be stored in memory 68 and/or another computer-readable medium that, when executed by processor 66, causes the processor 66 to perform various functionality.

Hardware 62 may include communication interface 70 facilitating communication between one or more elements in system 10. For example, communication interface 70 may be configured for establishing and maintaining at least a wireless or wired connection with one or more elements of system 10 such as control devices 22, premises devices 20, etc.

The processing circuitry 64 may be configured to control any of the methods and/or processes described herein and/or to cause such methods, and/or processes to be performed, e.g., in computing environment 14. Processor 66 corresponds to one or more processors 66 for performing computing device 60 functions described herein.

The memory 68 is configured to store data, such as files, remote monitoring system data, and/or other information/data. Also stored in the memory 68 and executable by the processor 66 are the remote monitoring system 18 and access control platform 19. Although FIG. 5 shows the remote monitoring system 18 and access control platform 19 being in a single computing device 60, the remote monitoring system 18 and access control platform 19 may execute in multiple computing devices 60 of the computing environment 14. To perform the functionality of the remote monitoring system 18 and access control platform 19, the memory 68 may include instructions that, when executed by the processor 66 and/or processing circuitry 64, causes the computing device 60 to perform the functionality performed by the remote monitoring system 18 and access control platform 19 described herein.

Figure 6A:
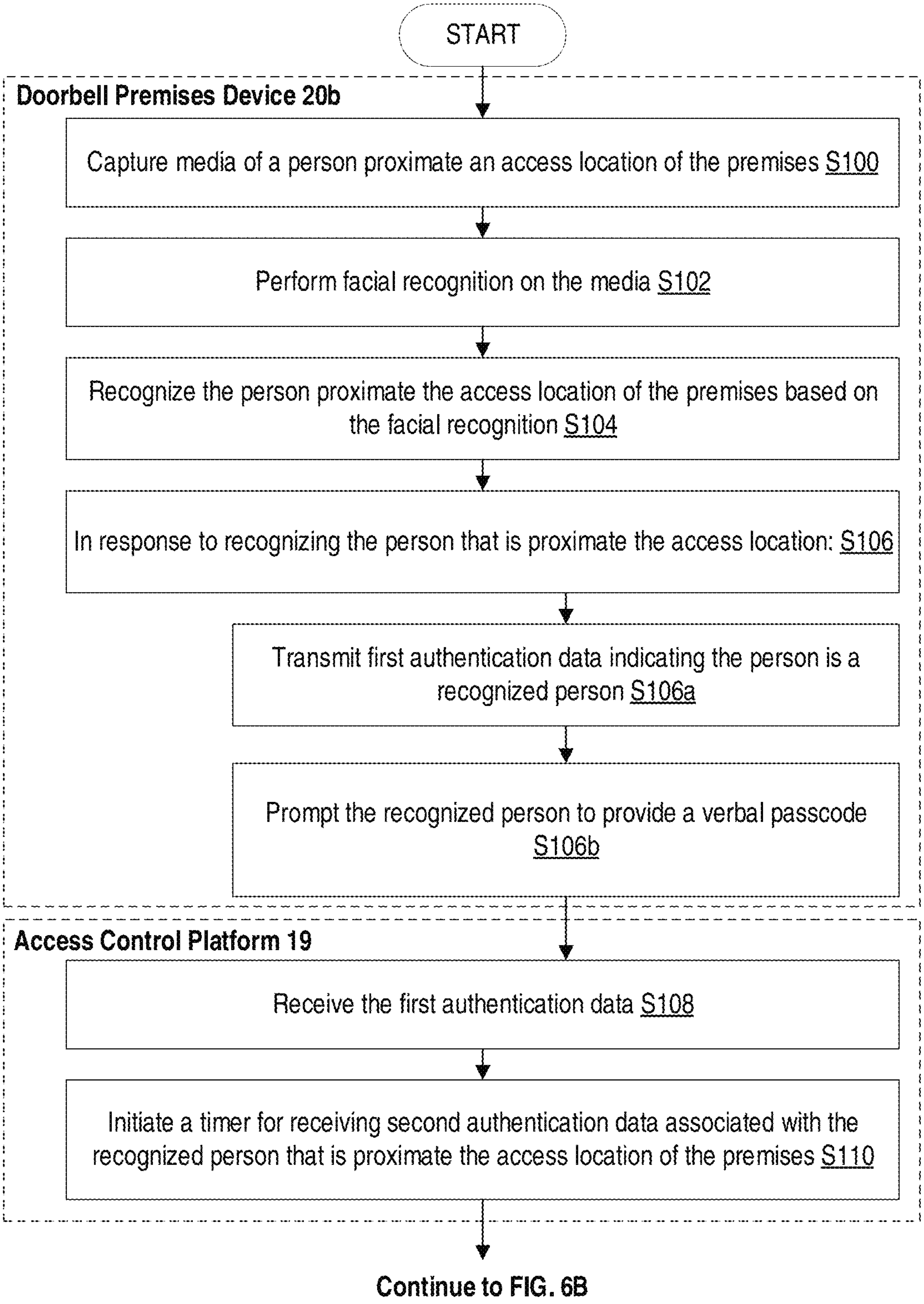
FIGS. 6A-6*b* is a flowchart of example functionality performed by components of the system of FIG. 1 and/or FIG. 2 according to some embodiments of the present disclosure.
Figure 6B:
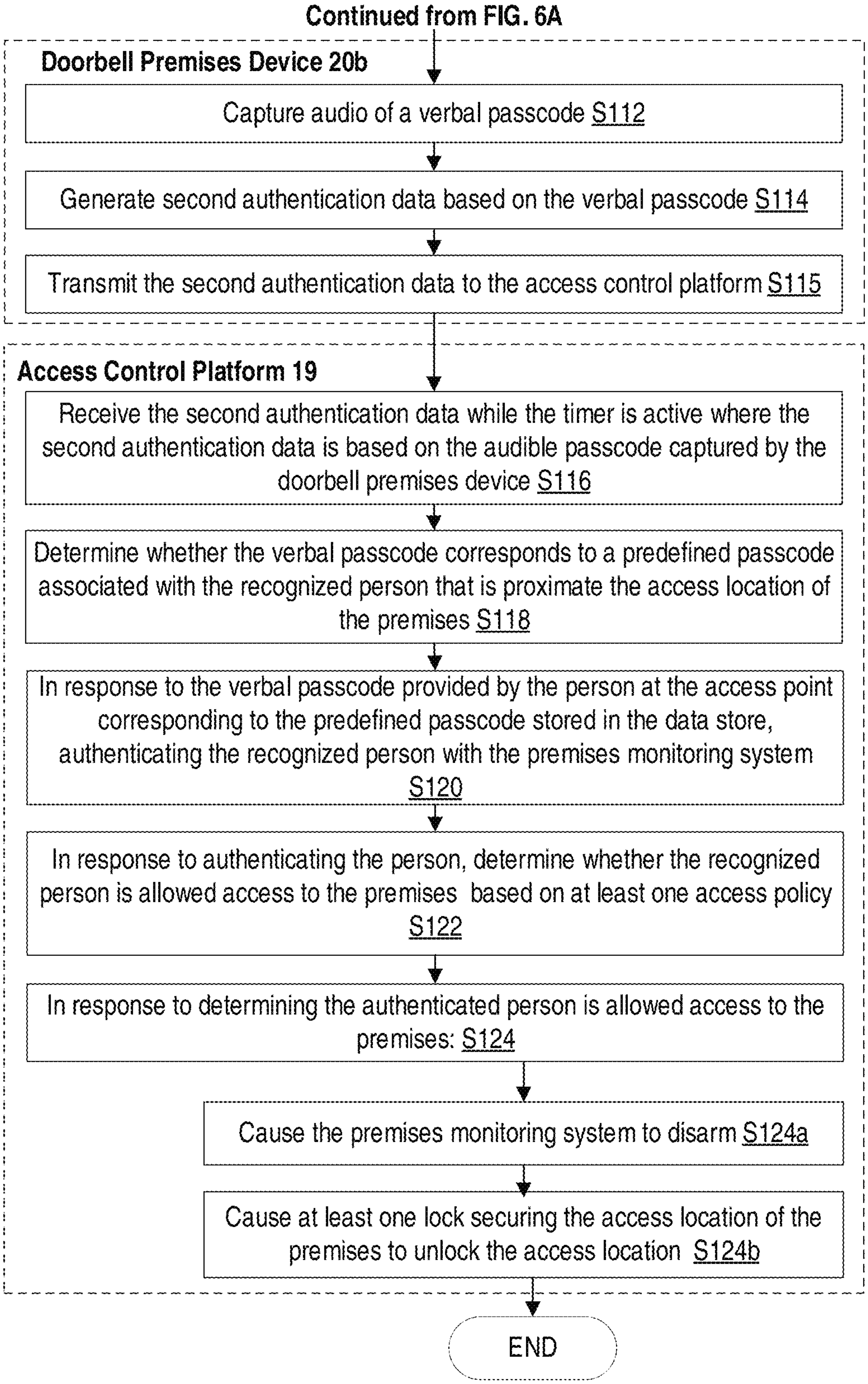

FIGS. 6A-B together are a flowchart of an example process according to some embodiments of the present disclosure. In particular, the flowchart of FIGS. 6A-6B depicts an example of the access control platform 19 granting a person access to a premises 13 after authenticating the person using first authentication data and second authentication data from the doorbell premises device 20*b*. In this example, the doorbell premises device 20*b* is embodied in the form of a networked doorbell (e.g., a smart doorbell) that includes a camera 48, microphone 50, and speaker 52. Furthermore, in the following discussion, the doorbell premises device 20*b* has been installed and positioned so that the field of view of the camera of the doorbell premises device 20*b* captures an area proximate to an entrance of the premises 13. As an example, the doorbell premises device 20*b* may be installed so that the field of view of its camera captures at least a portion of a walkway, porch, etc. in front of the front door of a home. Alternatively, one or more other premises devices 20 may be configured to perform at least some of the functions of doorbell premises device 20*b* that are described below.

Beginning at block S100, the process comprises the doorbell premises device 20*b* capturing media of a person proximate an access location of the premises 13 (Block S100). For example, doorbell premises device 20*b* may capture images and/or video of person that is approaching and/or proximate doorbell premises device 20*b* and/or an access point of the premises 13. The doorbell premises device 20*b* then performs facial recognition on the media (Block S102). For example, the doorbell premises device 20*b* may be configured to perform facial recognition on the video and/or images captured by doorbell premises device 20*b*.

At block S104, the doorbell premises device 20*b* recognizes the person proximate the access location of the premises 13 based on the facial recognition (Block S104). For example, recognizing the person may comprise using facial recognition to attempt to determine whether the face of the person matches a predefined profile that may include one or more stored facial recognition characteristics. At block S106, in response to recognizing the person that is proximate the access location (Block S106), the doorbell premises device 20*b* may transmit, to the access control platform 19, first authentication data indicating the person is a recognized person (Block S106*a*). For example, premises device 20*b* may transmit the first authentication data to computing environment 14*b* via network 15 or to computing environment 14*a* via control device 22. Further, in some embodiments, the doorbell premises device 20*b* may prompt the recognized person to provide a verbal passcode (Block S106*b*). For example, the doorbell premises device 20*b* may flash a light and/or play audio through a speaker that states, "Please state your passcode" to prompt the user to provide a verbal passcode. In another example, doorbell premises device 20*b* may cause an indication to appear on the recognized person's mobile phone, where the indication may be one or more of a haptic indication, visual indication (e.g., message, blinking light(s), etc.) or audible indication (e.g., audible message asking for a verbal passcode) provided by the mobile phone. Doorbell premises device 20*b* may be configured to trigger the indication directly with mobile device such as via BLUETOOTH communications and/or may be configured to request for computing environment 14 to trigger the indication at the mobile phone.

Proceeding to block S108, the access control platform 19 receives the first authentication data (Block S108). For example, access control platform 19 may receive the first authentication data from the doorbell premises device 20*b* and/or the computing environment 14*b*, as described above. At block S110, the access control platform 19 initiates a timer for receiving second authentication data associated with the recognized person that is proximate the access location of the premises (Block S110). For example, in accordance with an authentication criterion, at least two different types of authentication data may be required to be received within a predefined time window that may be defined by a countdown timer. Therefore, access control platform 19 may be configured to initiate the timer after receiving the first authentication data.

The process further comprises the doorbell premises device 20*b* capturing audio of a verbal passcode (Block S112). For example, doorbell premises device 20*b* may use microphone 50 to capture audio where the audio may include a verbal passcode spoken by the recognized person. Alternatively or in addition to capturing audio, the doorbell premises device 20*b* may be configured to capture a motion-based passcode and/or gesture-based passcode provided by the recognized person as part of the authentication process described herein. The process further comprises the doorbell premises device 20*b* generating second authentication data based on the verbal passcode (Block S114). For example, the second authentication data may comprise at least one of an audio file, text data generated using speech-to-text techniques on the verbal passcode, etc. The process further comprises the doorbell premises device 20*b* transmitting the second authentication data to the access control platform 19 (Block S115).

At block S116, the access control platform 19 receives the second authentication data while the timer is active, where the second authentication data is based on the audible passcode captured by the doorbell premises device 20*b* (Block S116). For example, access control platform 19 may track whether the second authentication data has been received before the timer expires. If the timer expires before computing environment 14 has received the second authentication data, computing environment 14 may notify the recognized person that the authentication process may have to be restarted. Alternatively, access control platform 19 may ask the recognized person whether they want the timer to be reset.

The process further comprises determining whether the verbal passcode corresponds to a predefined passcode associated with the recognized person that is proximate the access location of the premises 13 (Block S118). For example, in embodiments in which the second authentication data is an audio file of the verbal passcode, the access control platform 19 may convert the audio file to text, and the text may be compared to a predefined passcode stored in data store 21. The process further comprises, in response to the verbal passcode provided by the person at the access point corresponding to the predefined passcode stored in the data store 21, authenticating the recognized person with the premises monitoring system 12 (Block S120). For example, access control platform 19 is configured to determine an authentication criteria has been met, where meeting the authentication criteria may require the access control platform 19 receiving first authentication data and second authentication data within a predefined time window and authenticating the person based on the second authentication data.

At block S122, the process further comprises, in response to authenticating the person, the access control platform 19 determines whether the recognized person is allowed access to the premises 13 based on at least one access policy (Block S122). For example, access control platform 19 may be configured to determine whether the authenticated person is associated with one or more access policies and whether at least one of the access policies are met. For example, an access policy may define that the recognized and authenticated person is allowed access to the premises at a specific time and date (e.g., time-based access) or in response to a detected event (e.g., event-based access). Hence, access control platform 19 may verify the type of access the recognized person is allowed and determine whether one or more access policies (e.g., access policies based on time, event, alarm, etc.) are satisfied.

At block S124, the process further comprises, in response to determining the authenticated person is allowed access to the premises (Block S124), the access control platform 19 causes the premises monitoring system 12 to disarm (Block S124*a*) and causes at least one lock securing the access location of the premises to unlock the access location (Block S124*b*). For example, if access control platform 19 determines that one or more access policies are satisfied, access control platform 19 may transmit one or more commands to premises monitoring system 12 that cause premises monitoring system 12 to disarm and that cause at least one door lock premises device 20*c* (e.g., an electronic door lock) to unlock.

In another example, at block S124, the process further comprises, in response to determining the authenticated person is allowed access to premises 13, the access control platform 19 causes the premises monitoring system 12 to bypass one or more sensors (e.g., premises devices 20) and at least one lock to unlock instead of disarming the premises monitoring system 12. In this example, premises monitoring system 12 may monitor premises 13 in terms of monitoring zones where bypassing one or more sensors may correspond to bypassing one or more monitoring zones. One advantage of this example is that the monitoring zones that were not bypassed will remain active during the premises access event. That is, a bypassed sensor or zone will not trigger an alarm if the person enters the bypassed zone during the access event, but premises monitoring system 12 may initiate or trigger at least one action if the person enters an active monitoring zone (i.e., a zone where the person is not permitted during the access event).

Some examples of at least one action that may be initiated or triggered include one or more of: trigger an audible and/or visual feedback at premises 13, notify an authorized user, dynamically change the access profile associated with the person such as based on input from the authorized user, etc. The visual feedback may include turning OFF, by the premises monitoring system 12, the lights and/or electronic devices associated with the active monitoring zone while turning ON the lights associated with the bypassed zone, thereby providing a visual indication as to where the person is allowed access. In another example, premises monitoring system 12 may initiate an analysis of the person's movements if the person enters an active monitoring zone where the analysis may comprise determining whether the person's movements and/or actions are suspicious by, for example, applying machine learning model(s) to data from one or more premises devices 20 in the active monitoring zone.

Further, in various embodiments, access control platform 19 may be configured to determine that the person has left the premises 13. For example, an authenticated person has accessed the premises 13, after Blocks S124*a*-124*b* are performed, and access control platform 19 may determine that the person has left the premises 13 based on, for example, at least one of signaling, data or indications received from premises monitoring system 12. In response to determining that the person has left the premises 13, access control platform 19 may cause the lock (e.g., door lock premises device 20*c*) to transition from the unlocked state to the locked state and cause the premises monitoring system 12 to transition from the disarmed state to the armed state.

Further, access control platform 19 and/or premises monitoring system 12 may maintain a timestamped log entry for each time an entry is made to premises 13 using one of the types of access as described herein. The log can be reviewed periodically, and permissions (e.g., types of access) can be dynamically modified.

While one or more embodiments described herein relate to a single person being provided access, access control platform 19 may be configured to provide group-based alarm notification and premises access. In group-based notification and access, a predefined group of people is registered with access control platform 19 for respective types of access and/or for receiving emergency and/or non-emergency alerts from premises monitoring system 12. For example, a water leak may be detected by premises monitoring system 12 when the homeowner is out of town. In response to detecting the water leak, premises monitoring system 12 notifies one or more designated people in a group and provides time-based access to one or more members in the group for someone to shut off the water to premises 13.

In a burglar alarm example, group-based notification and access comprises sending an alarm signal and pertinent information to all of the designated users in the group. The community of users in the group can review the information, access video of people detected in premises 13 prior to and/or during the alarm, and confirm whether the alarm is a true alarm event requiring first responders or if it is a false alarm. In this example, the group may be provided with alarm-based access, as described herein.

In an independent living scenario, community monitoring may involve family, caregivers, neighbors, and service providers for which access to premises 13 is provided based on predefined schedules and predefined rules. For example, in-home grocery delivery providers can enter the home at scheduled times to deliver fresh food according to time-based access rules where authentication of a delivery person may occur as described herein. Family and caregivers can view a summary of daily activity (e.g., logs) that is maintained at computing environment 14. Further, first responders can gain access to premises 13 in the event of a fall or other emergency according to, for example, event-based access.

The concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspect. Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions and/or acts specified in the flowchart and/or block diagram block or blocks.

The functions and acts noted in the blocks may occur out of the order noted in the operational illustrations. For example, two blocks shown in succession may, in fact, be executed substantially concurrently, or the blocks may sometimes be executed in the reverse order, depending upon the functionality and/or acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In addition, unless mention was made above to the contrary, the accompanying drawings are not to scale. A variety of modifications and variations are possible in light of the above teachings without departing from the scope and spirit of the present disclosure.

What is claimed is:

1. A system, comprising:
- at least one computing device comprising:
  - at least one processor; and
  - at least one memory storing computing instructions that, when executed by the at least one processor, cause the at least one computing device to:
    - receive, from a third-party computing environment, first authentication data that indicates a person captured by a doorbell device installed at a premises is a recognized person that is known to the third-party computing environment;
    - receive, from the third-party computing environment, second authentication data based on audio captured by the doorbell device, the second authentication data indicating a verbal passcode spoken by the person at the premises;
    - authenticate the person based on:
      - the indication in the first authentication data that the person is a recognized person; and
      - a determination that the verbal passcode indicated in the second authentication data corresponds to a predefined passcode associated with the recognized person;
    - in response to the person being authenticated based on the first authentication data and the second authentication data, determine that the person is permitted access to the premises according to an access policy;
    - in response to determining that the person is permitted access to the premises according to the access policy, cause a security alarm system at the premises to transition from an armed state to a disarmed state; and
    - subsequent to causing the security alarm system to transition from the armed state to the disarmed state, cause a lock for an entrance of the premises to transition from a locked state to an unlocked state.

2. The system of claim 1, wherein the computing instructions are further configured to cause the at least one computing device to:
- determine that the person has left the premises; and
- in response to determining that the person has left the premises:
  - cause the lock to transition from the unlocked state to the locked state; and
  - cause the security alarm system to transition from the disarmed state to the armed state.

3. A system, comprising:
- at least one computing device comprising:
  - at least one processor; and
  - at least one memory storing computing instructions that, when executed by the at least one processor, cause the at least one computing device to:
    - receive, from a third-party computing environment, first authentication data that indicates a person captured on video by a premises device located at a premises is a recognized person that is known to the third-party computing environment;
    - receive, from the third-party computing environment, second authentication data indicating a verbal passcode of audio spoken by the person that is captured by the premises device;
    - authenticate the person based on:
      - the indication in the first authentication data that the person is a recognized person; and
      - a determination that the verbal passcode indicated in the second authentication data corresponds to a predefined passcode associated with the recognized person;
    - determine that the person is permitted access to the premises according to an access policy; and
    - in response to authenticating the person and determining that the person is permitted access to the premises, cause a lock securing an access point of the premises to unlock.

4. The system of claim 3, wherein the premises device is a doorbell device.

5. The system of claim 3, wherein the computing instructions are further configured to cause the at least one computing device to cause a premises monitoring system for the premises to disarm prior to causing the lock to unlock.

6. The system of claim 3, wherein the second authentication data comprises text generated by the premises device based on the audio of the person speaking the verbal passcode.

7. The system of claim 3, wherein the computing instructions are further configured to cause the at least one computing device to:

in response to the indication that the person is the recognized person, initiate a timer for receiving the second authentication data;

receive the second authentication data while the timer is active; and authenticate the person further based on the second authentication data being received while the timer is still active.

8. The system of claim 3, wherein the access policy is an alarm-based policy that permits the person to access the premises to in response to an alarm event being detected by a premises monitoring system for the premises.

9. The system of claim 3, wherein the access policy is an event-based policy that permits the person to access the premises in response to a predefined event being detected by a premises monitoring system for the premises.

10. The system of claim 3, wherein the access policy is a time-based policy that permits the person to access the premises based on time.

11. A method implemented by a system, the system comprising at least one computing device, the method comprising:

receiving, from a third-party computing environment, first authentication data that indicates a person captured on video by a premises device located at a premises is a recognized person that is known to the third-party computing environment;

receiving, from the third-party computing environment, second authentication data indicating a verbal passcode of audio spoken by the person that is captured by the premises device;

authenticating the person based on:

the indication in the first authentication data that the person is a recognized person; and a determination that the verbal passcode indicated in the second authentication data corresponds to a predefined passcode associated with the recognized person;

determining that the person is permitted access to the premises according to an access policy; and in response to authenticating the person and determining that the person is permitted access to the premises, causing a lock securing an access point of the premises to unlock.

12. The method of claim 11, wherein the premises device is a doorbell device.

13. The method of claim 11, further comprising causing a premises monitoring system for the premises to disarm prior to causing the lock to unlock.

14. The method of claim 11, wherein the second authentication data comprises text generated by the premises device based on the audio of the person speaking the verbal passcode.

15. The method of claim 11, further comprising:

in response to the indication that the person is the recognized person, initiating a timer for receiving the second authentication data;

receiving the second authentication data while the timer is active; and authenticating the person further based on the second authentication data being received while the timer is still active.

16. The method of claim 11, wherein the access policy is one of:

an alarm-based policy that permits the person to access the premises to in response to an alarm event being detected by a premises monitoring system for the premises;

an event-based policy that permits the person to access the premises in response to a predefined event being detected by the premises monitoring system for the premises.

17. The method of claim 11, wherein the access policy is a time-based policy that permits the person to access the premises based on time.

* * * * *